United States Patent
Burchell et al.

[11] Patent Number: 4,658,601
[45] Date of Patent: Apr. 21, 1987

[54] CRYOGENIC CELL

[75] Inventors: Steven P. Burchell, Folly Hill; Nicholas W. Kerley, Standlake; David W. Mellor, Blackwater, all of England

[73] Assignee: The British Petroleum Company p.l.c., London, England

[21] Appl. No.: 706,113

[22] Filed: Feb. 27, 1985

[51] Int. Cl.[4] ............................................. F25B 19/00
[52] U.S. Cl. ..................................... 62/514 R; 250/352
[58] Field of Search ....................... 62/514 R; 250/352

[56] References Cited

U.S. PATENT DOCUMENTS

| | | | |
|---|---|---|---|
| 3,258,602 | 6/1966 | Promish | 62/514 R |
| 3,435,629 | 4/1969 | Hallenberg | 62/514 R |
| 3,702,932 | 11/1972 | Tanner et al. | 62/514 R |
| 4,241,592 | 12/1980 | Tapphorn | 62/514 R |
| 4,312,192 | 1/1982 | Zarudiansky et al. | 62/514 R |
| 4,313,317 | 2/1982 | Janssen et al. | 62/514 R |
| 4,340,405 | 7/1982 | Steyert Jr. et al. | 62/514 R |
| 4,375,157 | 3/1983 | Boesen | 62/514 R |

Primary Examiner—Ronald C. Capossela
Attorney, Agent, or Firm—Morgan & Finnegan

[57] ABSTRACT

A cryogenic cell comprises a sealed external annular chamber, adapted to be maintained under vacuum which chamber surrounds a heat shield. A section of the shield is exposed and is adapted to make contact with a closed cycle cooler. The shield encloses a sealed inner chamber adapted for the storage of a solid/liquid refrigerant. The shield has a relatively thin base and sidewall and the section which is exposed is a relatively thick upper collar which has a well leading to the top of the inner chamber immediately above and in contact with the top of the inner chamber. The inner chamber is connected at its lower end to a section containing an absorbent and the latter section is connected at its lower end to a further chamber suitable for the reception of a gamma radiation detector. The cryogenic cell is suitable for keeping the semi-conductor detector of a neutron borehole logging tool at the required low temperature.

8 Claims, 2 Drawing Figures

CRYOGENIC CELL

This invention relates to a cryogenic cell and more particularly to a cryogenic cell suitable for use in a neutron activation analysis borehole logging tool.

Borehole logging tools comprise a probe for insertion down the borehole, the probe comprising a radioactive source of neutrons, a shield against radioactivity and a gamma ray detector.

The gamma spectrum obtained from the neutron-gamma method registers the stimulated emission of gamma rays when the radioactive source is used to bombard the formation surrounding the bore hole with neutrons. It can be interpreted to give an indication of the nature of the formation.

Such tools are used for well logging in the petroleum industry.

Attention is now turning to the in-situ analysis of coal deposits in addition to oil. However, this gives rise to considerable problems. The major elements present produce a complex activation gamma spectrum comprising some four hundred gamma lines in the range 0.0 to 10.0 MeV. This implies a mean separation of 25 KeV between lines. In practice, many lines of interest are separated by less than 25 KeV. Therefore it follows that a gamma ray detector with the capability to resolve lines appreciably less than 25 KeV apart is required.

This restricts the choice of detector to a semi-conductor detector and since the latter must be kept at low temperatures (around $-180°$ C.) some form of intensive cooling is necessary.

Another proposal has been to take advantage of the latent heat of fusion of substances such as propane with melting points around $-180°$ C. According to one method of operation, the melting hydrocarbon is contained in a vessel and the resulting vapours are allowed to escape. This has the advantage of maintaining the temperature constant over longer periods but suffers from the disadvantages of the loss of refrigerant and more seriously, the production of a potentially explosive gaseous mixture. Another disadvantage lies in the requirement to use liquid nitrogen in order to cool the hydrocarbon to below its melting point. This process precludes use of the technique in remote areas of the world where liquid nitrogen is unavailable.

It is an object of the present invention to produce a safe, totally enclosed cryogenic cell for a neutron activation logging tool which does not suffer from the above disadvantages.

According to the present invention there is provided a cryogenic cell comprising an external annular chamber (a), adapted to be maintained under vacuum and partially enclosing a heat shield (b), surrounding and spaced apart from an enclosed inner chamber (c) adapted for the storage of a solid/liquid refrigerant, the space between the heat shield (b) and the chamber (c) forming an annular chamber (d) adapted to be maintained under vacuum, the heat shield (b) having a relatively thin base and sidewall and a relatively thick exposed upper collar having a well therein leading to the top of the chamber (c), the collar, well and top of the chamber (c) being adapted to receive a "cold finger" to lower the temperature of the shield (b) and chamber (c), the chamber (c) being connected at its lower end to a further chamber (e) suitable for the reception of a gamma radiation detector.

Preferably the chamber (c) is connected to the chamber (e) by way of a section containing an absorbent.

The outer wall of the external chamber (a) is preferably fabricated from a metal resistant to corrosion and of high tensile strength such as stainless steel.

The walls of the heat shield (b) and chamber (c) are preferably highly polished so that the emissivity of the surfaces is low and are fabricated from a metal of high thermal conductivity and high specific heat capacity such as copper.

In this respect, Oxygen Free High Conductivity Copper (OFHC) is particularly advantageous over more ordinary forms of copper including phosphorus deoxygenated copper.

The absorbent in the lower tube acts as a cryopump and adsorbs impurities within the vacuum chamber. Suitable adsorbents include molecular sieves.

The refrigerant is generallly substantially solidified before commencement of operations, although a small vapour space is preferably left. This eliminates the use of intermediate cryogenic materials such as liquid nitrogen.

Suitable refrigerants include hydrocarbons with low triple points such as propane and butene-1.

The cryogenic cell is particularly suitable for use in maintaining the gamma ray detector of a neutron activation logging tool within the required low temperature range.

Separating the thermal mass of the shield into a relatively thick upper collar and relatively thin sidewall and base portions results in a more efficient and flexible configuration.

This is because the thermal mass of the heat shield may be increased without substantially increasing its length, diameter and/or surface area.

Conversely, the dimensions of the cryostat can be reduced without loss of thermal mass since material can be transferred from the sidewall and base to the collar.

Thus the configuration of the present application is particularly suitable for use in slim-line instruments for narrow boreholes.

Thus according to another aspect of the present invention there is provided a neutron logging tool comprising a probe containing in sequence from the bottom end a radioactive source of neutrons, a shield against radioactivity, a semi-conductor detector for gamma radiation and a cryogenic cell as hereinbefore described for maintaining the detector within a low temperature range.

Suitable neutron sources include a 5Ci $Am^{241}$-Be isotopic source and accelerator type sources which produce 14 MeV neutrons by the (D,T) reaction.

The shield against radioactivity is preferably a composite shield assembly comprising a heavy metal scatterer and a hydrogenous moderator.

A suitable detector is a reverse-electrode (N-type) hyperpure coaxial germanium type. A particular advantage of N-types is their increased resistance to neutron damage over P-types.

The output of a semi-conductor detector is of the order of picoamps and therefore a preamplifier is necessary. Losses and noise may be reduced by positioning the preamplifier in a separate compartment as physically close to the detector as possible. The pre-amplifier field effect transistor is preferably positioned on the pre-amplifier printed circuit board—this is referred to as a warm FET configuration—and avoids the use of a cold FET within the vacuum chamber. A particular advantage of this configuration is ease of maintenance and repair.

The cryogenic cell may be cooled by commercially available closed cycle coolers suitably modified to provide compatible cold fingers.

Above the cryogenic cell will be the detector EHT supply, the main amplifier and the cable driver which transmits a signal via an armoured logging cable.

BRIEF DESCRIPTION OF THE DRAWINGS

The invention is illustrated with reference to FIGS. 1 and 2 of the accompanying drawing which are schematic sections of cryogenic cells.

Figure 1:
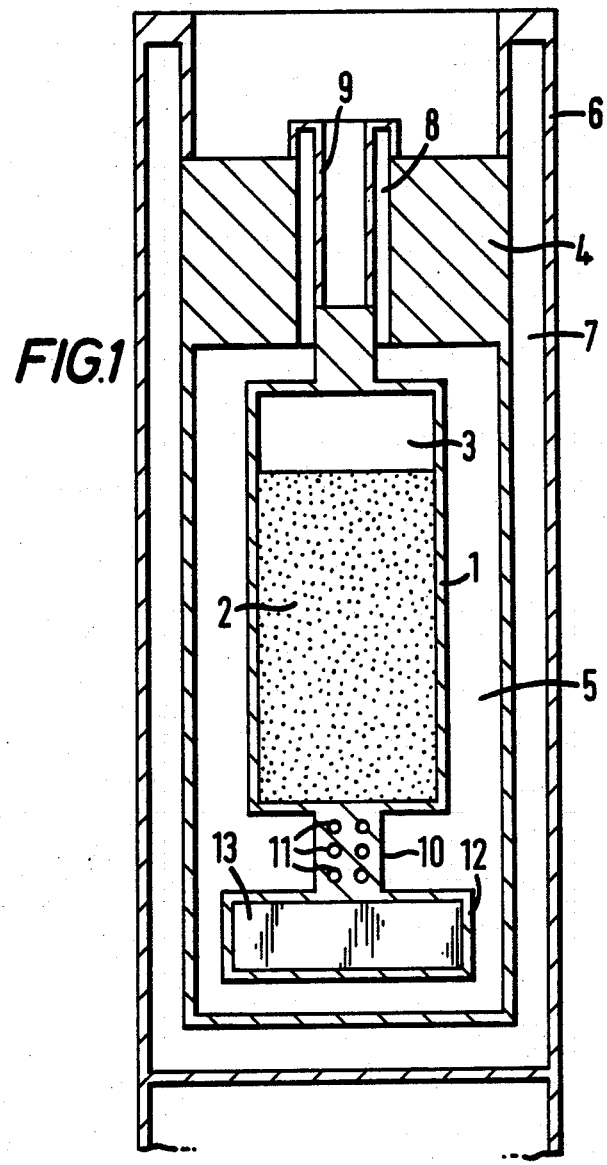
With reference to FIG. 1, the cell comprises a highly polished inner, OFHC copper pressure vessel 1 containing solid/liquid propane 2 of 99.99% purity, although a vapour space 3 is left. The purity level of the propane is important to reduce the risks of supercooling and eutectic shifts in melting point.

The cell is initially charged with propane and then sealed for life. Alternatively the cell may be charged with butene-1 and then sealed for life. Butene-1 offers approximately 3% improvement in holding time over propane.

The inner vessel 1 is placed within a highly polished copper heat shield 4 and the space 5 between the two vessels is evacuated to provide a vacuum.

The heat shield 4 is itself placed within a stainless steel outer vessel 6 and the space 7 between is also evacuated. It has a central aperture 8 into which is fitted a stainless steel tube 9, the bottom of the tube being directly above the top of the inner vessel 1. The heat shield 4 has a relatively thick collar surrounding the aperture 8 and a relatively thin sidewall and base.

At its lower end, the inner vessel 1 is formed into a cylindrical section 10 containing apertures 11 for containing a molecular sieve adsorbent for removing traces of impurities from the vacuum.

A hollow thin walled aluminium block 12 containing a detector 13 is connected to the cylindrical section 10.

In order to chill the contents of the cell before operating the logging tool, a closed cycle cooler is contacted with the exposed upper surface of the heat shield 4 and a "cold finger" is inserted into the well 9.

Figure 2:
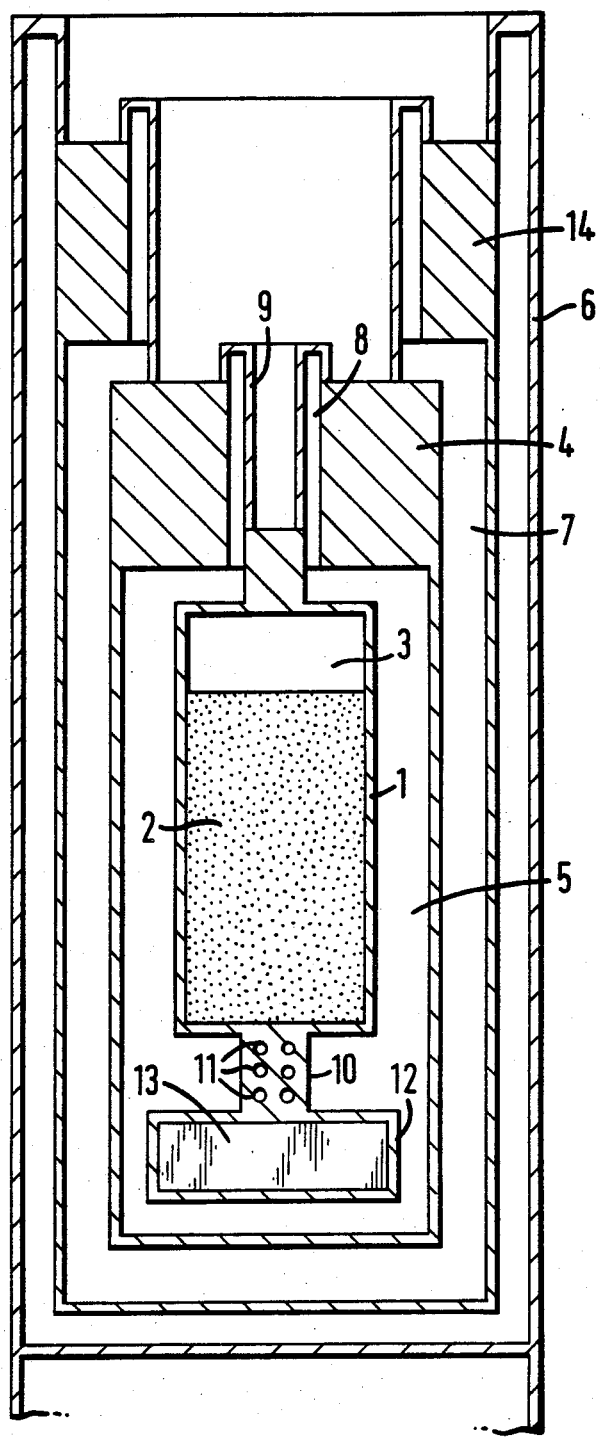

The cell shown in FIG. 2 is similar to that in FIG. 1 with the addition of a second heat shield 14 which is similar in structure to the heat shield 4.

We claim:

1. A neutron logging tool comprising a probe containing in sequence from the bottom end a source of neutrons, a shield against radioactivity, a semiconductor detector for gamma radiation and a cryogenic cell comprising an external annular chamber, adapted to be maintained under vacuum and partially enclosing a heat shield fabricated from a metal of high thermal conductivity and high specific heat capacity, surrounding and spaced apart from an enclosed inner chamber adapted for the storage of a solid/liquid refrigerant, the space between the heat shield and the chamber forming an annular chamber adapted to be maintained under vacuum, the heat shield having a relatively thin base and sidewall and a relatively thick exposed upper collar having a well therein leading to the top of the chamber, the collar, well and top of the chamber being adapted to receive a "cold finger" to lower the temperature of the shield and chamber, the chamber being connected at its lower end to a further chamber suitable for the reception of a gamma radiation detector.

2. A cryogenic cell comprising an external annular chamber, adapted to be maintained under vacuum and partially enclosing a heat shield fabricated from a metal of high thermal conductivity and high specific heat capacity, surrounding and spaced apart from an enclosed inner chamber adapted for the storage of a solid/liquid refrigerant, the space between the heat shield and the chamber forming an annular chamber adapted to be maintained under vacuum, the heat shield having a relatively thin base and sidewall and a relatively thick exposed upper collar having a well therein leading to the top of the chamber, the collar, well and top of the chamber being adapted to receive a "cold finger" to lower the temperature of the shield and chamber, the chamber being connected at its lower end to a further chamber suitable for the reception of a gamma radiation detector.

3. A cryogenic cell according to claim 2 wherein the walls of the heat shield are highly polished.

4. A cryogenic cell according to claim 2 wherein the chamber is connected to the chamber by way of a section containing an absorbent.

5. A cryogenic cell according to claim 2 wherein the outer wall of the external chamber is fabricated from stainless steel.

6. A cryogenic cell according to claim 2 wherein the wall of the chamber are highly polished and fabricated from a metal of high thermal conductivity, and high specific heat capacity.

7. A cryogenic cell according to either of claims 3 or 6 wherein the metal of high thermal conductivity and high specific heat capacity is copper.

8. A cryogenic cell according to claim 7 wherein the copper is oxygen-free high conductivity copper.

* * * * *